(12) United States Patent  
Ribesse

(10) Patent No.: US 7,736,401 B2  
(45) Date of Patent: Jun. 15, 2010

(54) METHOD OF GASIFYING CARBONACEOUS MATERIALS AND A DEVICE FOR IMPLEMENTING IT

(75) Inventor: Jacques Ribesse, Brussels (BE)

(73) Assignee: Luis De Azcoitia, Blegny (BE)

( * ) Notice: Subject to any disclaimer, the term of this patent is extended or adjusted under 35 U.S.C. 154(b) by 470 days.

(21) Appl. No.: 11/719,621

(22) PCT Filed: Nov. 15, 2005

(86) PCT No.: PCT/EP2005/055978

§ 371 (c)(1),  
(2), (4) Date: May 17, 2007

(87) PCT Pub. No.: WO2006/053869

PCT Pub. Date: May 26, 2006

(65) Prior Publication Data

US 2009/0145028 A1 Jun. 11, 2009

(30) Foreign Application Priority Data

Nov. 18, 2004 (BE) .................................. 2004/0567

(51) Int. Cl.
*C01B 3/36* (2006.01)
*C10J 3/46* (2006.01)
*C10J 3/54* (2006.01)
*C10J 3/16* (2006.01)
*F28B 3/00* (2006.01)
*F28B 9/10* (2006.01)
*F28F 7/00* (2006.01)
*F24J 1/00* (2006.01)

(52) U.S. Cl. .......................... 48/197 R; 48/202; 48/210; 165/111; 165/139; 126/263.02

(58) Field of Classification Search ..................... 48/61, 48/62 R, 63, 73, 77, 197 R, 202, 210; 165/9.1, 165/9.2, 9.3, 9.4, 111, 139; 126/263.02
See application file for complete search history.

(56) References Cited

FOREIGN PATENT DOCUMENTS

| EP | 089 329 A2 | 9/1983 |
|---|---|---|
| EP | 1 312 662 A2 | 5/2003 |
| EP | 1 431 373 A1 | 6/2004 |
| ES | 2 190 689 A1 | 8/2003 |

*Primary Examiner*—Alexa D Neckel  
*Assistant Examiner*—Matthew J Merkling  
(74) *Attorney, Agent, or Firm*—Sughrue Mion, PLLC

(57) ABSTRACT

The invention relates to a method for the gasification of carbonaceous materials in the form of solid particles. The inventive method comprises the following steps consisting in: heating a gaseous mixture formed by a feed gas and water vapor in a heater (1); bringing the particles of the carbonaceous materials into contact with the heated gaseous mixture in a pressurized gasification reactor (2), with the formation of a raw reaction gas and unburnt ash; separately supplying the heater with (i) water vapour and (ii) the aforementioned feed gas; taking separate samples from the heater of the gaseous mixture (at point 13) and of part of the feed gas in the dry state (at point 16); and injecting into the gasification reactor said dry feed gas and a gas forming therewith a fuel mixture in the ash.

10 Claims, 4 Drawing Sheets

METHOD OF GASIFYING CARBONACEOUS MATERIALS AND A DEVICE FOR IMPLEMENTING IT

The present invention relates to a method of gasifying carbonaceous materials in the form of solid particles, comprising
- a heating of a gaseous mixture formed from a feed gas and steam in a heater, to a temperature of at least 1200° C.,
- a putting in contact, in a pressurised gasification reactor, of the particles of carbonaceous materials and the said heated gaseous mixture with the formation of a raw reaction gas and unburnt ash,
- a recovery of the raw reaction gas from the reactor,
- a fusion of the ash, and
- an elimination of the molten ash.

Carbonaceous materials in the form of solid particles should be taken to mean any solid material containing carbon in the fragmented state, such as for example biomasses, industrial residues, household waste, hard coal, bituminous coal, wood waste, etc.

Many gasification techniques functioning under pressure are known. The majority of the known methods are specialised for a restricted range of raw materials and have fairly unsatisfactory performance. The majority of these methods are slow and produce large quantities of tar, the elimination of which is complicated. These methods also neglect the treatment of the ash.

A method of the type described at the start is known (see patent application ES-A-2190689). This method is applicable to any carbonaceous material and, after the gasification reaction, provides for a fusion of the ash and a vitrification of the molten ash for elimination thereof. This method does still however have the drawback of a performance that is still unsatisfactory in particular in the degree achieved of combustion of the carbon contained in the material to be gasified.

The aim of the present invention is to propose a gasification method in which the gas obtained has qualities and performance at least equal, and preferably superior to, those of the known method, and in which the ash is discharged in a form intensely free from carbonaceous elements and particularly almost non-polluting, and this in a simple and economical manner.

To resolve this problem there has been provided according to the invention a method as described at the start, which also comprises
- a separate supply to the heater of steam on the one hand and the said feed gas on the other hand,
- a separate taking-off, from the heater, of the said gaseous mixture at the said temperature of at least 1200° C. on the one hand and part of the said feed gas in the dry state and at this same temperature on the other hand, and
- in the gasification reactor, an injection of this dry feed gas and a gas forming with it a combustible mixture into the ash issuing from the said gasification reaction, in order to achieve by combustion a temperature above 1500° C.

The method according to the invention offers the advantage of making it possible to superheat not only the gaseous mixture that is to serve for the gasification reaction at a temperature above 1200° C., preferably 1300 to 1400° C., but also simultaneously a dry feed gas that will be able to form in the reactor a combustible mixture for treating the ash at a temperature above 1500° C., advantageously 1600° C. At this temperature the combustible mixture consumes all the residual carbon in the unburnt materials that underwent the gasification reaction, and the gas issuing from the combustion of the combustible mixture and enriched with CO by passing through the ash rejoins the raw reaction gas, increasing the qualities of the latter.

At the temperatures indicated the gasification reaction is so rapid that there is no passage through the normal tar formation phase, which simplifies the method and reduces the cost thereof.

According to a preferred embodiment of the method of the invention, the said heating of the said gaseous mixture takes place in a horizontal heater, filled with refractory thermal materials, and it comprises, sequentially,
- during a first period of time, a first phase of heating the refractory thermal materials in a first part of the heater by passing through this first part fume gases obtained by the combustion of combustible gas and combustion air, and a first heat exchange phase between the refractory thermal materials, previously heated, in a second part of the heater and the steam and feed gas fed into this second part of the heater, and
- during a second period of time, a second phase of heating the refractory thermal materials in the second part of the heater that have been cooled during the said first heat exchange phase, by passing through this second part the abovementioned fume gases, and a second heat exchange phase between the refractory thermal materials in the first part of the heater, which were heated during the said first heating phase, and the steam and feed gas fed into this first part of the heater, and
- a step of purging the part of the heater where the fume gases have just passed before it is supplied with feed gas and steam to be heated by heat exchange.

In this embodiment, the heater functions as a quasi-continuous burner.

According to an advantageous embodiment of the invention, the said feed gas is air, the said heated gaseous mixture is a mixture of air and steam and the said gas forming, with the heated dry feed gas, a combustible mixture is a gaseous fuel. In this case the gasification is carried out in the presence of an oxidising gaseous medium which makes it possible to produce, after cooling and purification, a purified reaction gas that can be used in industrial furnaces or for supplying gas turbines or various engines.

According to another embodiment of the invention, the said feed gas is a combustible gas, the said heated gaseous mixture is a mixture of this combustible gas and steam and the said gas forming, with the heated dry feed gas, a combustible mixture is an oxidant gas. In this case, the gasification is carried out advantageously in the presence of a recycled gas mixed with steam, which makes it possible to produce synthesis gas with a view to the production for example of ammonia, methanol or synthetic liquid fuel, or the direct reduction of ores.

Other particularities of the method according to the invention are indicated in the accompanying claims.

The present invention also concerns a heater for implementing the method according to the invention. This heater comprises
- a horizontal cylindrical casing,
- a vertical perforated partition dividing this casing into two parts, each filled with refractory thermal materials,
- in each of the two parts of the casing, at least one inlet for the steam situated on a side opposite to the said perforated partition and at a higher level, as well as at least one inlet for the feed gas also situated on a side opposite to the said perforated partition and at a lower level compared with the said at least one inlet for steam,
- for the two parts of the casing, an outlet for the said heated gaseous mixture, between the said two parts, at the top of the heater, and an outlet for the dry heated feed gas, between the said two parts, at a level lower than that of the outlet for the heated gaseous mixture, at least one burner, to which the combustible gas and the combustion air is supplied, and which is situated at the bottom of the heater close to the perforated partition, and in each of the two parts of the casing, at least one outlet for the fume gases situated at the said side opposite to the perforated partition.

Through the reciprocal arrangements of the various inlets and outlets and the said at least one burner, it is possible, according to the invention, to produce, in one and the same heater, continuously and simultaneously, a heated moist feed gas and a heated dry feed gas.

Other particularities of the heater according to the invention are indicated in the accompanying claims.

Other details and advantages of the invention will emerge from the description, given below non-limitingly and with reference to the drawings of embodiments of the invention.

In the various drawings, identical or analogous elements bear the same references.

Figure 1:
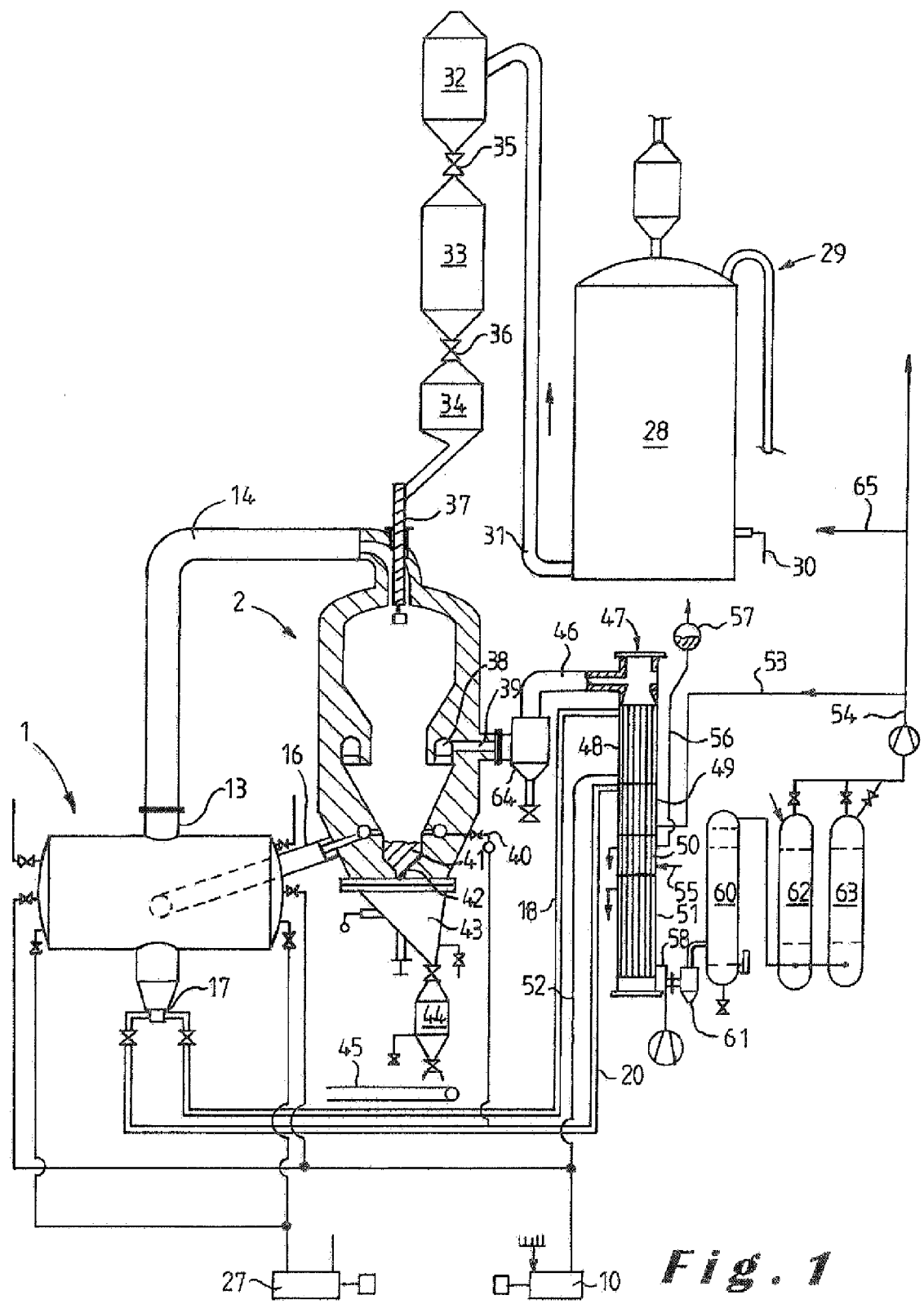
FIG. 1 depicts schematically an installation for the gasification of carbonaceous materials implementing a method according to the invention.

FIG. 1 illustrates an example of an embodiment of an installation according to the invention. This installation comprises a gas heater 1 that supplies a gasification reactor 2 with an oxidising gaseous mixture formed from air and steam, at a temperature of at least 1200° C., and dry air at this same temperature.

Figure 2:
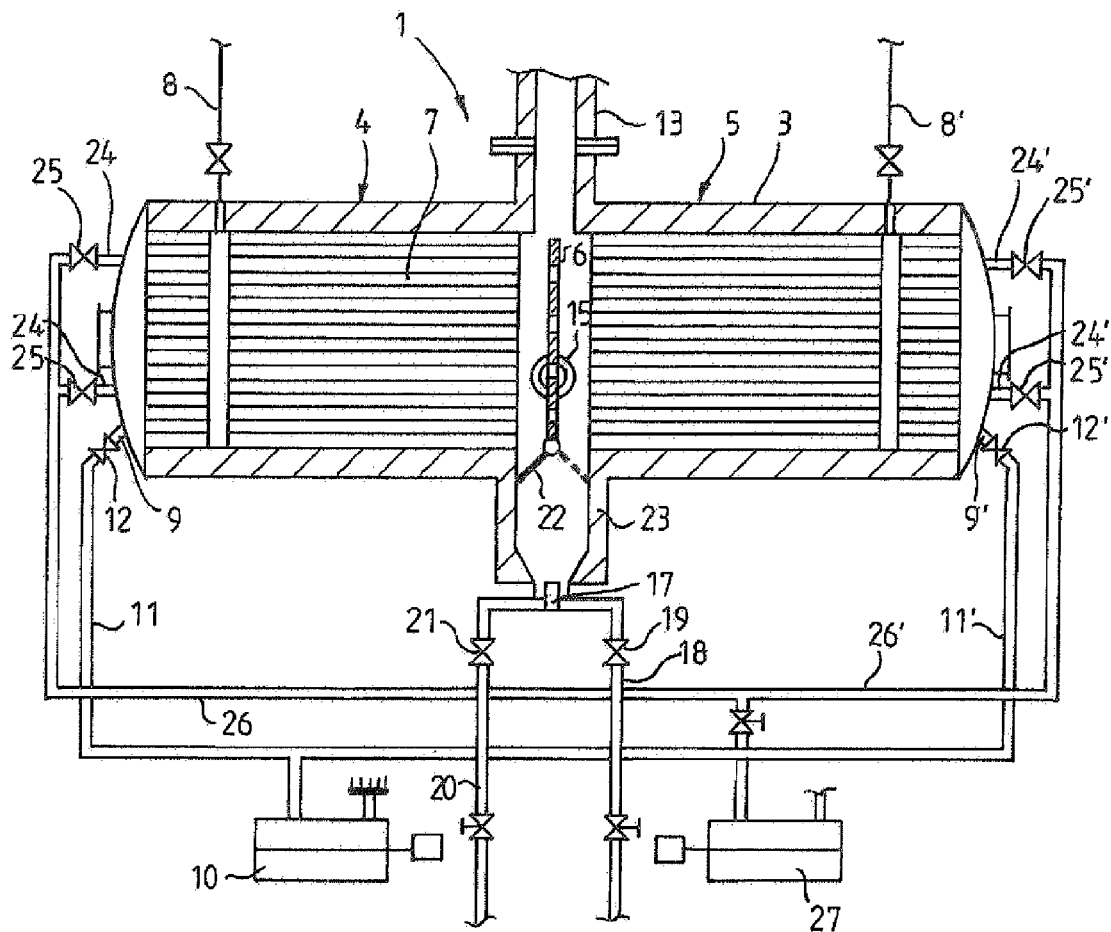
FIG. 2 is, to an enlarged scale, a view in schematic axial section of a heater as illustrated in FIG. 1.
Figure 3:
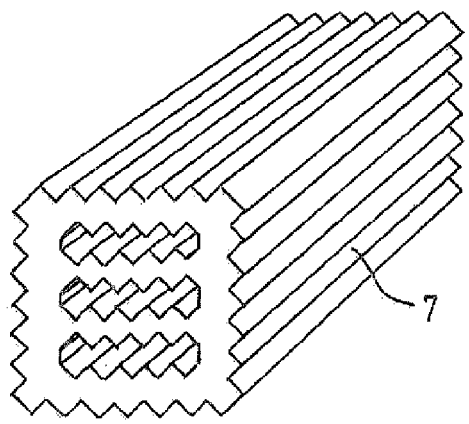
FIG. 3 is a perspective view of a refractory thermal element that can be used in the heater of FIG. 2.

As illustrated in FIG. 2, the heater has a cylindrical casing 3 that is disposed horizontally and divided into two parts 4 and 5, advantageously symmetrical, by a perforated vertical partition 6. These two parts are filled with refractory thermal materials 7, one element of which is shown in more detail in FIG. 3. Naturally this is shown by way of illustration and many other forms of refractory thermal materials can be applied.

In each of the two parts 4, 5 of the casing an inlet has been provided for steam 8, 8' that is situated opposite to the perforated partition 6. This steam inlet 8, 8' is situated at the top of the heater 1 and can be closed off by a valve. There has also been provided in each of these parts 4, 5, also opposite to the perforated partition, an inlet 9, 9' for a feed gas which, in the example of embodiment, is air. This is situated at a lower level than that of the inlet 8, 8' for the steam, in particular at the bottom of the heater 1, and it is supplied with air by a compressor 10 connected to these inlets 8, 8' by a conduit 11, 11' that can be closed off by a valve 12, 12'.

The heater also comprises an outlet 13 for the heated gaseous mixture of air and steam, an outlet that is the only one for the two parts 4 and 5 in the example illustrated and that communicates with the gasification reactor through a conduit 14. This single outlet 13 is situated between the two parts 4 and 5 of the heater, above the perforated partition 6, so as to be in simultaneous communication with the abovementioned two parts 4 and 5.

The heater also comprises an outlet 15 for heated dry air which, in the example illustrated, is common for the two parts 4 and 5 of the casing, and therefore the only one. This outlet 15 is situated in the bottom half of the heater. It is in communication with the gasification reactor 2 through the conduit 16.

The heater also comprises a burner 17 which, in the example illustrated, is common for the two parts 4, 5 of the casing and therefore the only one. Here it is supplied with combustion air, preferably already hot, through a conduit 18 that can be closed off by a valve 19, and with combustible gas, preferably already hot, through a conduit 20 that can be closed off by a valve 21. A valve 22 puts the combustion chamber 23 where the burner opens out in communication with one or the other of the parts 4 and 5 of the heater, in alternation. Each of these parts is provided with at least one outlet for the fume gases, here two outlets 24, 24', able to be closed off by valves 25, 25'. The fume gases are discharged under pressure through the conduits 26, 26' to an expansion device 27.

Figure 4:
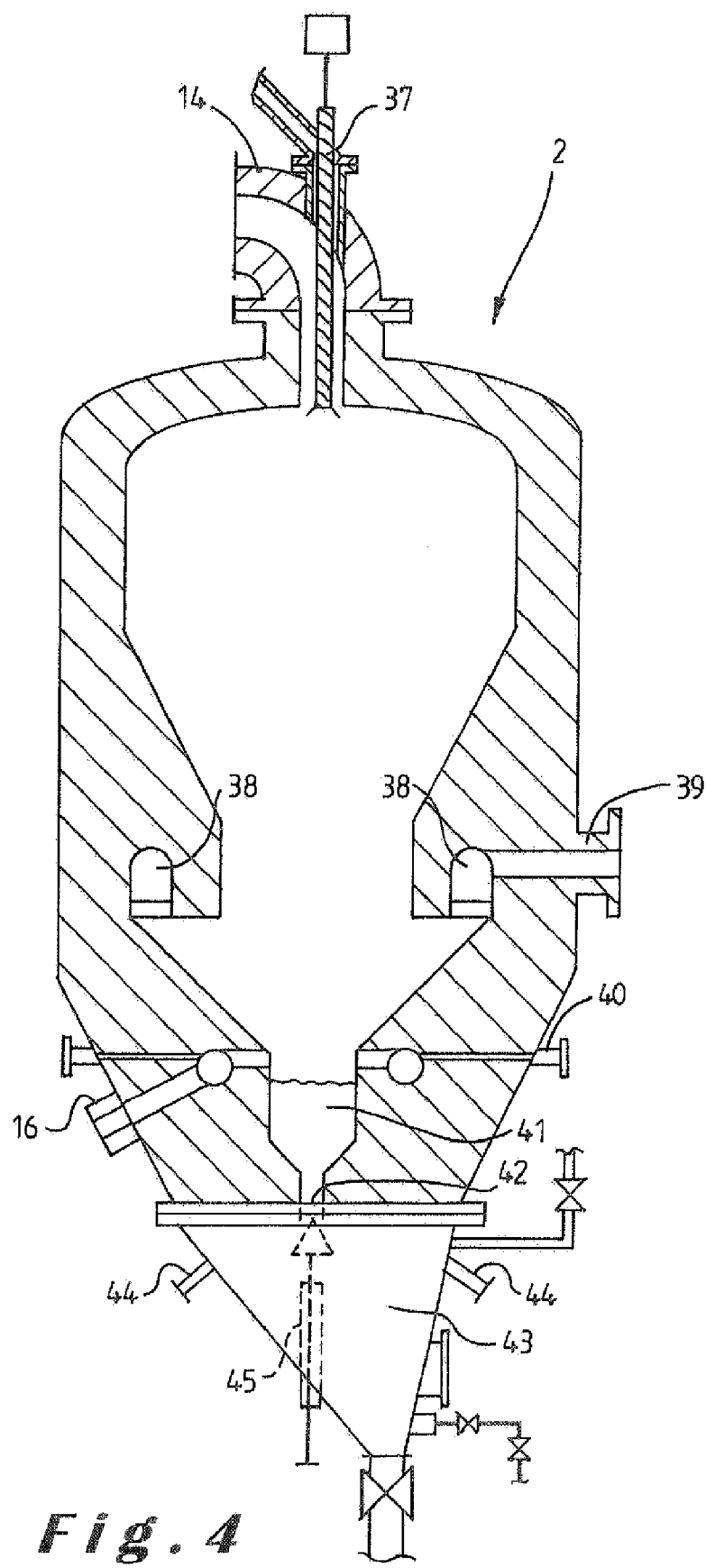
FIG. 4 depicts, to an enlarged scale, a schematic view of a gasification reactor according to the invention, as illustrated in FIG. 1.

The gasification reactor, as illustrated in FIGS. 1 and 4, is supplied with carbonaceous materials 29 from a storage reservoir 28 into which heated dry air can be introduced at 30, at the bottom of the reservoir 28. This is provided with an elevator 31 that emerges at the top of an intermediate reservoir 32, which is in communication through the bottom with a pressurised reservoir 33, then with a reservoir under permanent pressure 34. These reservoirs 32, 33 and 34 are respectively separated by valves 35 and 36.

The gasification reactor 2 is supplied with material to be gasified at its top, by a material injection screw 37 receiving this material from the reservoir 34 and introducing it into the jet of heated oxidising gaseous mixture that emerges under pressure in the reactor.

In its central part, the reactor 2 illustrated is provided with an annular conduit 38 for collecting the reaction gases and this conduit communicates with a lateral outlet conduit 39.

In the bottom part of the reactor 2 illustrated there emerge the conduit 16 that supplies the heated dry air coming from the heater and a conduit 40 to which a gaseous fuel is supplied.

In the bottom of the reactor where the molten ash 41 accumulates, an orifice 42 is provided for discharging it into a pressurised sprinkler chamber 43 provided with nozzles 44 for injecting water in atomised form. The orifice 42 is provided with a flow control member 45 known per se. The sprinkler chamber 43 communicates through the bottom with an intermediate reservoir 44, and then with a conveyor belt 45.

The outlet conduit 39 for the raw reaction gas is connected by a conduit 46 to a heat exchanger 47 which, in the example illustrated, comprises four stages. The top stage 48 is provided with an inlet and an outlet for the combustion air. The following stage 49 is provided with an inlet and an outlet for the combustible gas and the following stage 50 is provided with an inlet for water and an outlet for steam. The bottom stage 51 is provided with an inlet and an outlet for the drying air.

The combustion air inlet is, in the example illustrated, connected by the conduit 52 to the air compressor 10 and the combustion air outlet is connected by the conduit 18 to the burner 17 of the heater 1.

The combustible gas inlet is, in the example illustrated, connected by the conduit 53 to the purified reaction gas outlet conduit 54. The combustible gas outlet is connected to the burner 17 by the conduit 20.

The entry for the water in the stage 50 of the heat exchanger takes place at 55 and the steam leaving through the conduit 56 can be transmitted, by means of the receptacle 57, to the inlets for the steam 8 and 8' of the heater 1.

The entry for the drying air in the stage 51 takes place at 58 and the heated dry air leaving at 59 is supplied at 30 for drying the carbonaceous materials to be treated.

The bottom of the heat exchanger 47 is, by means of a filter 61, in communication with a washer 60, followed by a purifier with two stages 62 and 63, lined with activated carbon and functioning in alternation. The purified reaction gas outlet conduit 54 is connected to the top of these two purifier stages.

The installation according to the invention, as illustrated in FIGS. 1 to 4, functions in the following manner:

in a first period of time, a phase of heating the part 5 of the heater 1 takes place. The valve 22 is in the position shown in solid lines in FIG. 2. Air preheated to a temperature of 750° C. in the stage 48 of the heat exchanger 47 and combustible gas preheated to a temperature of 450° C. in the stage 49 in this same exchanger are brought to combustion in the burner 17. The combustible gas, in the example illustrated, comes from a partial recycling of the purified reaction gas obtained at 54. The fume gases pass through the thermal materials 7 of the part 5 of the heater, heating these to a high temperature, and are then discharged through the outlet 24', the conduit 25' and the device 27, where an expansion is effected. During this time, the inlet valve 8' for the steam and the valve 12' for the air inlet are closed.

During this same first period of time, the part 4 of the heater allows a heat exchange. Steam formed from water, heated in the stage 50 of the exchanger 47 and conducted to the heater from the receptacle 57 as far as the inlet 8, is introduced through the top at one end of the heater. During this time, air compressed at 10 is injected into a bottom area of this same part 4 of the heater, through the inlet 9. The valves 25 of the fume gas outlets are then closed.

By controlling the flow rate of the gases, it is possible to avoid in the heater a mixing between the fume gases and the oxidising gases.

The air heated by the thermal materials in the part 4 of the heater mix with steam heated in the top area of this part and this oxidising mixture leaves the heater through the conduit 13 at a temperature that may attain 1300 to 1400° C. At the same time, in the bottom area of the part 4, the air does not mix with steam and is on the contrary dried, which allows a simultaneous discharge of dry air through the conduit 15 at a temperature also of 1300 to 1400° C.

This first period of time may last for example from 2.5 to 4 minutes.

A reversal of the valves in each of the parts of the heater is then carried out. In order to purge the part 5 of the fume gases, the combustible gas feed is cut off by closing the valve 21, for two seconds, and then the valve 22 is placed in the position illustrated in broken lines in FIG. 2. During this second period of time, it is the part 4 of the heater that is subjected to the heating step and the part 5 to the heat exchange. The heater thus functions continuously.

The expansion device 27 makes it possible to recover 80% of the energy necessary for the compression of the air in the compressor 10. The completely burnt gases leaving the expansion device 27 are discharged to the atmosphere.

In the example of embodiment illustrated, the carbonaceous material previously dried by air preheated in the heat exchanger 47 is in the form of coarse particles of around 10 to 40 mm and it is brought to the top of the gasification reactor 1. There it is fed into a current of oxidising gaseous mixture air+steam at very high temperature (1300-1400° C.), forming a fluidised bed where a reaction occurs, without passing through the tar formation phase.

The reaction in the reactor 2 produces a raw reduction gas having a temperature of around 900° C. The gas is discharged, via the circular conduit 38, the conduit 39, a cyclone separator 64 and the conduit 46, to the heat exchanger 47, the four stages 48 to 51 of which it runs through from top to bottom. The cooled raw reaction gas then passes through the filter 61, the gas washer 60 and one of the two purifier stages 62, 63, which makes it possible to obtain a purified reaction gas, part of which can be recycled and used for the functioning of the burner 17.

As indicated above, the dry air, which is very hot (1300-1400° C.) is injected into a bottom part of the gasification reactor 2, through the conduit 16. At the same time, combustible gas preheated to 750° C. in the heat exchanger 47 is injected at 40. This combustible gas also comes from a recycling of the purified reaction gas obtained. The combustion of this combustible gas in dry air causes a rise in temperature to more than 1500° C., possibly up to 1600° C. The ash issuing from the gasification reaction carried out at the top of the reactor 2 and which falls has the gas from the latter combustion pass through it and all the carbon that it still contains is thus consumed, these gases being harvested with the reaction gas through the conduit 38.

Moreover, at this high temperature, the ash 41 liquefies and accumulates at the bottom of the reactor 2 in molten form. Its level is controlled by differential pressure and it flows into the sprinkler chamber 43 where, by means of water jets, it is cooled and vitrified in order then to be discharged by means of the conveyor belt 45.

Figure 5:
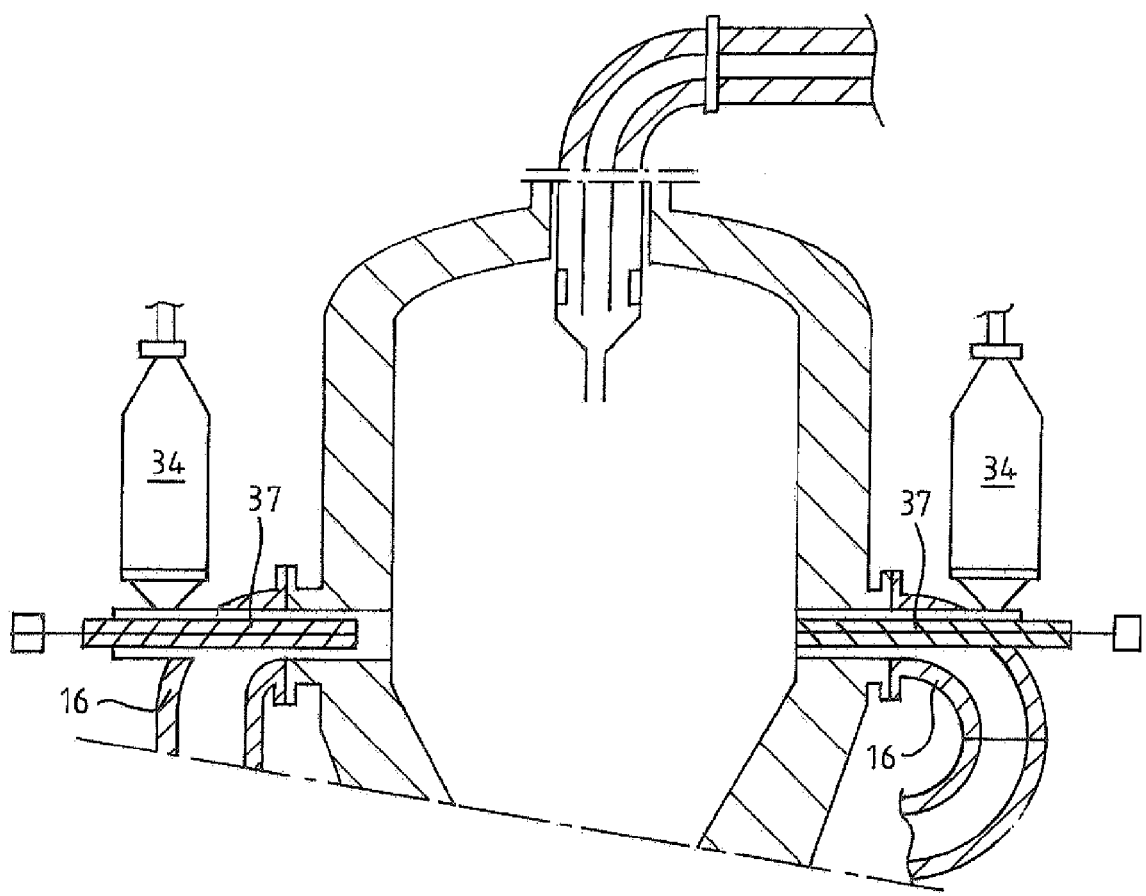
FIG. 5 depicts a partial schematic view of a variant embodiment of a gasification reactor that can be used according to the invention.

According to a variant embodiment illustrated in FIG. 5, it is possible for example to use finer carbonaceous materials, the particles of which have a size of around 0.5 to 8 mm. These are supplied from several reservoirs under permanent pressure 34 disposed peripherally around the reactor, by means of several feed screws 37. The oxidising gaseous mixture air+steam is also injected tangentially at these screws 37, which makes it possible to form in the middle of the reactor a circulating bed in which the gasification reaction takes place.

In this example of embodiment the raw reaction gas is harvested at the top of the reactor, whilst the bottom part of the latter can be identical to what is illustrated in FIG. 4.

According to another variant embodiment of the invention, it is also possible to make provision for heating in the heater 1, instead of air, a combustible gas, and in particular recycled reaction gas that has been taken off for example at 65 in the purified reaction gas outlet conduit. The heated gaseous mixture leaving the heater through the conduit 14 is therefore a mixture of recycled reaction gas+steam, while the dry gas leaving through the conduit 16 is dry recycled reaction gas, which is a combustible gas. By means of the conduit 40, there is supplied not a gaseous fuel but an oxidant gas, for example oxygen. This method makes it possible to produce, at the outlet from the installation, a purified synthesis gas that has a CO+H2 concentration >90%. The net yield of the gasification can then be around 82%.

It should be noted that an important advantage of the method according to the invention is that the emissions to the atmosphere do not contain any harmful elements of the S, Cl, P, NO or fly ash type, nor an injection of polluting materials such as tar, toxic liquids and the like.

The following table illustrates the results obtained by the method according to the invention according to the raw material used and the type of gasification provided.

|  | Gasification in oxidising medium Material ||| In the presence of recycled gas |
| --- | --- | --- | --- | --- |
|  | Animal flour | Biomass | Carbon | Production of synthesis gas |
| Pressure in bar | 15 | 15 | 20 | 5 |
| Usage | Gas turbine | Gas turbine | Gas turbine | — |
| Contents in purified gas in % by vol. |  |  |  |  |
| CH4 | 3.2 | 4.5 | 3.5 | 0.3 |
| CO | 29.0 | 30.5 | 34.0 | 45.3 |
| H2 | 29.0 | 26.5 | 31.0 | 51.5 |
| CO2 | 4.2 | 5.0 | 3.2 | 0.6 |
| N2 | 34.6 | 33.5 | 28.3 | 2.3 |
| NCV* in kJ/m3 | 7921 | 8300 | 8872 | 11360 |
| Yield** | 0.88 | 0.88 | 0.88 | 0.82 |

*NCV = net calorific value of the useful purified gas
**Yield = NCV useful purified gas/NCV dry material It must be understood that the invention is in no way limited to the methods and embodiments described above and that many modifications can be made thereto within the scope of the accompanying claims.

The invention claimed is:

1. Method of gasifying carbonaceous materials in the form of solid particles, comprising
a heating of a gaseous mixture formed from a feed gas and steam in a heater, to a temperature of at least 1200° C.,
a putting in contact, in a pressurised gasification reactor, of the particles of carbonaceous materials and the said heated gaseous mixture with the formation of a raw reaction gas and unburnt ash,
a recovery of the raw reaction gas from the reactor,
a fusion of the ash, and
an elimination of the molten ash,
characterized in that it also comprises
a separate supply to the heater of steam on the one hand and the said feed gas on the other hand,
a separate taking-off, from the heater, of the said gaseous mixture at the said temperature of at least 1200° C. on the one hand and part of the said feed gas in the dry state and at this same temperature on the other hand, and
in the gasification reactor, an injection of this dry feed gas and a gas forming with it a combustible mixture into the ash issuing from the said gasification reaction, in order to achieve by combustion a temperature above 1500° C.

2. Method according to claim 1, characterised in that said heating of the said gaseous mixture takes place in a horizontal heater, filled with refractory thermal materials, and in that it comprises, sequentially,
during a first period of time, a first phase of heating the refractory thermal materials in a first part of the heater by passing through this first part fume gases obtained by the combustion of combustible gas and combustion air, and a first heat exchange phase between the refractory thermal materials, previously heated, in a second part of the heater and the steam and feed gas fed into this second part of the heater, and
during a second period of time, a second phase of heating the refractory thermal materials in the second part of the heater that have been cooled during the said first heat exchange phase, by passing through this second part the abovementioned fume gases, and a second heat exchange phase between the refractory thermal materials in the first part of the heater, which were heated during the said first heating phase, and the steam and feed gas fed into this first part of the heater, and
a step of purging the part of the heater where the fume gases have just passed before it is supplied with feed gas and steam to be heated by heat exchange.

3. Method according to claim 2, characterised in that it comprises
in each of the said first and second parts of the heater, the supply of the feed gas to be heated at a level lower than the supply of steam,
in a top zone of the heater, a continuous taking-off of the said gaseous mixture of feed gas and steam at the said temperature of at least 1200° C., and
in a zone of the heater lower than the said top zone of continuous taking-off of the said gaseous mixture, a continuous taking-off of the said dry feed gas at the said temperature of at least 1200° C.

4. Method according to claim 1, characterised in that the said feed gas is air, in that the said heated gaseous mixture is a mixture of air and steam and in that the said gas forming, with the heated dry feed gas, a combustible mixture is a gaseous fuel.

5. Method according to claim 1, characterised in that the said feed gas is a combustible gas, in that the said heated gaseous mixture is a mixture of this combustible gas and steam and in that the said gas forming, with the heated dry feed gas, a combustible mixture is an oxidant gas.

6. Method according to claim 2, characterised in that it comprises a cooling of the raw reaction gas recovered from the reactor and, by heat exchange during this cooling, in isolation or in any combination, a preheating of the combustion air used in the heater, a preheating of the combustible gas used in the heater, a formation from water of steam to be used in the heater and a heating of drying air to be sent through the carbonaceous materials to be gasified.

7. Method according to claim 4, characterised in that it comprises a purification of the raw reaction gas and a recycling of at least part of the purified reaction gas as a combustible gas for the said first and second heating phases of the heater.

8. Method according to claim 5, characterised in that it comprises a purification of the raw reaction gas and a recycling of at least part of the purified reaction gas as a feed gas for the heater.

9. Method according to claim 1, characterised in that it comprises an injection through the top of the reactor of the particles of carbonaceous material and the said heated gaseous mixture with the formation of a fluidised bed, a discharge of the molten ash at the bottom of the reactor and a recovery of the reaction gas at an intermediate level.

10. Method according to claim 1, characterised in that it comprises a high-speed tangential injection, at an intermediate level between the top and bottom of the reactor, of the particles of carbonaceous materials and the said heated gaseous mixture, a recovery of the raw reaction gas at the top of the reactor and a discharge of the molten ash at the bottom of the reactor.

* * * * *